(12) United States Patent
Riedel et al.

(10) Patent No.: US 6,435,719 B1
(45) Date of Patent: Aug. 20, 2002

(54) LINEAR GUIDE DEVICE

(75) Inventors: Gerhard Riedel; German Dütsch, both of Schweinfurt (DE)

(73) Assignee: Rexroth Star GmbH (DE)

( * ) Notice: Subject to any disclaimer, the term of this patent is extended or adjusted under 35 U.S.C. 154(b) by 0 days.

(21) Appl. No.: 09/451,998

(22) Filed: Nov. 30, 1999

(30) Foreign Application Priority Data

Dec. 10, 1998 (DE) .......................... 198 57 028

(51) Int. Cl.[7] .......................... F16H 19/04; F16H 35/08
(52) U.S. Cl. .......................... 384/15; 384/49
(58) Field of Search .......................... 384/15, 24, 40, 384/45, 49; 277/345; 269/73; 74/89.17, 396, 566

(56) References Cited

U.S. PATENT DOCUMENTS

| | | | |
|---|---|---|---|
| 4,163,591 A | * 8/1979 | Hennig et al. | 384/15 |
| 4,481,869 A | * 11/1984 | Garlapaty | 384/15 |
| 4,512,208 A | * 4/1985 | Lipinski et al. | 74/424.8 R |
| 4,685,383 A | * 8/1987 | Ruchser | 277/345 |
| 4,704,913 A | * 11/1987 | Zimmer | 384/15 |
| 4,706,510 A | * 11/1987 | Zimmer | 384/15 |
| 5,106,205 A | * 4/1992 | Coron | 384/15 |
| 5,415,483 A | * 5/1995 | Franklin, Jr. | 74/89.21 X |
| 5,517,901 A | * 5/1996 | Lipinski | 277/345 |
| 5,575,566 A | 11/1996 | Faulhaber | 384/45 |
| 5,778,758 A | * 7/1998 | Barth et al. | 277/345 |
| 5,784,925 A | * 7/1998 | Trost et al. | 74/490.09 |
| 5,845,996 A | 12/1998 | Greubel et al. | 384/45 |
| 6,012,846 A | 1/2000 | Lambertz et al. | 384/15 |
| 6,200,030 B1 | * 3/2001 | Katoh | 384/15 |
| 6,241,230 B1 | * 6/2001 | Kawaguchi | 384/15 X |

FOREIGN PATENT DOCUMENTS

| | | |
|---|---|---|
| DE | 4334311 | 4/1995 |
| EP | 0784167 | 7/1997 |

OTHER PUBLICATIONS

Mannesmann Rexroth Deutsche Star, "Star Schienenführungstische", Prospectus RD 82 501/06.96, 1 page.
Telingater, "Protective Devices for Machine Tool Slideways", *Machines & Tooling*, vol. XXXIX, No. 2, pp. 48–54.

* cited by examiner

*Primary Examiner*—David A. Bucci
*Assistant Examiner*—Colby Hansen
(74) *Attorney, Agent, or Firm*—Baker Botts LLP (57) ABSTRACT

A linear guide device comprises a guide rail (10) with a longitudinal axis (12) and at least one guideway (16), as well as a runner carriage (14) guided at the guideway (16), in the direction of the longitudinal axis. The guideway (16) is covered before and after the runner carriage (14) in the direction of the longitudinal axis (12) substantially over its entire length by a cover strip (56) which in one embodiment lies against two cover strip contact zones (58), disposed on both sides of the guideway (16), of the guide rail (10). The guideway (16) and the cover strip contact zones (58) are in particular formed at a rail body of the guide rail (10) which is of a uniform base material. The cover strip (56) protects the guideway (10) against contaminants which may cause damage to the guideway (16) and impair the smooth running and guide precision of the runner assembly (14) on the guide rail (10).

52 Claims, 5 Drawing Sheets

LINEAR GUIDE DEVICE

BACKGROUND OF THE INVENTION

The invention relates to a linear guide device, comprising a guide rail with a longitudinal axis and at least one guideway, and a runner assembly guided at the guideway, of which there is a least one, in the direction of the longitudinal axis.

Contaminants on the guideway may impair the smooth running and guide precision of the runner assembly and cause premature wear. These contaminants may come from hot chips which are produced in cutting machine tools and come to lie on the guideways, in which case there is even a risk of the chips burning into the guideways. Other contaminants are particles of dirt and dust, which may settle on the guideways. If they mix with coolants or lubricants, this may produce an abrasive mixture which, if it enters the runner assembly, may cause abrasion at the guideways and the guide members of the runner assembly. Although conventional runner assemblies are frequently sealed off all round from the guide rail, the possibility of contaminants entering the interior of the runner assembly cannot be entirely ruled out. For it is often not possible to prevent microroughness in the guide rail surface and at the sealing elements which are used. The contaminants may then penetrate through such microroughness to the interior of the runner assembly.

STATEMENT OF THE PRIOR ART

It is known to cover the guide rail by a bellows which is coupled in terms of movement to the runner assembly in order to provide protection against contaminants, as presented, for example, in a prospectus of the company Deutsche Star entitled "Schienenführungstische" ("Rail guide tables"), number RD 82501/06.96. However the material of the bellows may easily scorch because of hot chips, which is why telescopically retractable and extensible covering mechanisms have been resorted to for applications in which a high incidence of hot chips is to be expected. However these mechanisms entail a high expenditure. The bellows and telescopic covering also require storage space, which reduces the available travel of the runner assembly.

Also known from DE 43 34 311 A1 is a covering solution in which a guide rail is mounted in a U-shaped profiled housing on the bottom thereof and the longitudinal opening of the housing is closed by a cover strip which lies against the mutually opposite side walls of the housing. This solution offers reliable protection against the penetration of contaminants into the interior of the housing, although depends on the presence of the U-shaped profiled housing and is therefore only suitable for special applications.

OBJECT OF THE INVENTION

The object of the invention is to present a covering solution which is suitable for a broad field of application of the linear guide devices and which affords reliable protection against contaminant-induced impairments of the guide quality of the linear guide device.

SUMMARY OF THE INVENTION

A linear guide device comprises a guide rail with a longitudinal axis and at least one guideway. A runner assembly is guided at the guideway, of which there is a least one, in the direction of the longitudinal axis.

The guideway is covered—in the direction of the longitudinal axis—on both sides of the runner assembly substantially over the respective entire usable remaining length by a cover strip which lies against at least one cover strip contact zone of the guide rail or is so close to said cover strip contact zone as to prevent contaminations to reach said cover strip contact zone without "real body contact". The cover strip preferably lies, however, directly against the guide rail. There is as a result very little dependence on the constructional installation conditions of the linear guide device, irrespective of whether this is constructed with or without a U-housing for example. In addition, as it is not necessary for the cover strip to be compressed and expanded like bellows, it may be made of a material which is sufficiently insensitive to hot chips. The covering solution according to the invention entails a distinctly lower construction expenditure than the above-mentioned telescopic coverings.

The cover strip contact zones and the guideway may basically correspond, at least in part. Optimum adaptation of the cover strip contact zone to the requirements of the cover strip, especially as regards the tightness of the system, without having to take account of the specific configuration of the guideway, can be achieved by the cover strip contact zone and the guideway differing, at least in part.

Optimum preservation of the guideway is achieved if the cover strip covers the guideway in contact-free fashion and lies against cover strip contact zones of the guide rail which are located transversely to the longitudinal axis on both sides of the guideway. This can easily be achieved by disposing the guideway in a depression in the guide rail which is covered by the cover strip and is formed between the cover strip contact zones.

Generally speaking, the opposite cover strip contact zones will comprise large-side contact zones against which the cover strip lies at its large side which faces the guideway., In this case it is advisable for the large-side contact zones to be formed by plane, coplanar contact faces. The cover strip can thus lie flatly and tightly against the guide rail.

However it is also possible for at least one cover strip contact zone to be formed as a narrow-side contact zone against which the cover strip lies at its narrow sides. There is no possibility of the aligning function of the narrow-side contact zones causing the cover strip to slip and possibly expose the guideway locally, in particular when mutually opposite narrow-side contact zones are formed at the guide rail for both narrow sides of the cover strip.

The linear guide device may be installed in such a way that the cover strip lies against a—in the installed position vertically lower side of the guide rail and is consequently at risk of separating from the guide rail, if it is not tensioned with sufficient tautness, and allowing dirt to penetrate to the guideway. It is expedient, in particular—although not exclusively—in a case of this kind to provide securing means at the guide rail and/or at the cover strip which secure the cover strip to the guideway outside of the region of the runner assembly in the covering position. This may be achieved, for example, by the possibility of frictionally clamping the cover strip between mutually opposite narrow-side contact zones. Alternatively to or in addition to this, it may be possible to positively secure the cover strip in its covering position at the guide rail by, for example, undercutting the narrow-side contact zones for the engagement of the narrow sides of the cover strip. The cover strip may be retained with some play in the undercuts of the narrow-side contact zones. However it may also be clamped at its narrow sides or/and at its large sides. The cover strip may also be secured by locking means which, rather than passing over the entire length of the guide rail, are formed just locally and distributed over the length of the guide rail.

The runner assembly may be constructed in end regions with strip curvature means which give the cover strip a forced curvature facilitating its entry between mutually opposite narrow-side contact zones and therefore reducing the distance between the narrow sides of the cover strip. The curvature of the cover strip may be of assistance in enabling it to be easily introduced into undercuts of the guide rail by way of its longitudinal edges. It is in this case possible for the cover strip to completely uncurve again after being introduced into the undercuts. If, on the other hand, the cover strip is to be frictionally clamped at its narrow sides, it is advisable to adapt the width of the cover strip to the securing means such that the cover strip is pre-curved in the covering position.

According to a further variant, the securing means may also be achieved by the possibility of retaining the cover strip in the covering position through magnetic means.

The guideway and the cover strip are preferably formed together at a rail body of the guide rail which is of a uniform base material, and the rail body may undergo purely secondary hardening or/and coating operations in the region of the guideway or/and of the cover strip contact zone in order, for example, to improve the quality of the guide rail and its load-bearing capacity. The guideway and the cover strip contact zone may in particular be disposed at the rail body of an integrally coherent material, although it is basically also possible for the guideway and the cover strip contact zone to be formed at rail sub-bodies which, although of the same base material, are separate.

The guide rail frequently comprises two or more guideways rather than just one. In this case it is advisable for the guide rail to comprise at least two guideways extending parallel to one another and being jointly covered by the cover strip.

The invention is particularly applicable to guide rails which comprise a fastening face, a top face lying opposite the fastening face and two side faces connecting the fastening face to the top face, with at least one respective guideway being formed in each of the side faces and at least one respective cover strip being provided at each side face for the associated guideway, of which there is at least one. In this case it is particularly favorable if, when there are at least two respective guideways in each of the side faces, all the guideways of each of the side faces are covered by a respective common cover strip.

The cover strip may comprise a metallic material, in particular steel. It may also comprise a plastics material. In this case the possibility of producing the cover strip from different materials, possibly with a metallic core, which provides the desired strength, and a jacket of a plastics material or rubber, which provides a good seal between the cover strip and the guide rail, is not to be excluded.

The invention is basically suitable for all types of guidance of the runner assembly on the guide rail. Thus the runner assembly may be guided in sliding fashion on the guideway formed as a slideway. The runner assembly may equally be guided in rolling fashion on the guideway formed as a rolling track. In the latter case the runner assembly may be guided on the rolling track by at least one roller rotatably mounted on the assembly. It is, however, also possible for the runner assembly to be guided on the rolling track by at least one row of rolling bodies circulating along a continuous circulation path.

The cover strip may be fastened to the runner assembly to move together with the latter along the longitudinal axis. It may be deflected in the region of the rail ends at deflection means and closed to form a loop by a returning strip section. It is basically also possible to provide two take-up rolls in each case in the region of the rail ends, from or onto which the cover strip can be unwound or wound, according to the direction of movement of the runner assembly. The cover strip may even exhibit longitudinal elasticity.

According to a preferred embodiment, the cover strip runs over a support face arrangement of the runner assembly in sweeping fashion at its large side which faces the guideway, and the runner assembly comprises approach means which retain the cover strip before and after the support face arrangement in the longitudinal direction close to the guide rail. Although it is basically possible for two guideways disposed on opposite sides of the guide rail to be covered by a closed cover strip loop which is stationary with respect to the guide rail, it is preferable for the cover strip to have free strip ends which are retained at the guide rail ends, which are spaced apart in the longitudinal direction. In this respect it is advisable if at least one of the strip ends can be anchored in an anchorage block which is supported at an axial front face of the associated rail end, as it is thus possible to avoid additional machining of the guide rail. It is expedient if two cover strips disposed at opposite side faces of the guide rail can be anchored in the anchorage block.

Mounting is facilitated by a solution in which the anchorage block can be fitted axially on the associated rail end and for this purpose comprises at least one axial plug part by which it engages axially over the guide rail at its outer circumference.

The cover strip can preferably be tensioned by tensioning means which are disposed in the region of at least one rail end. It is in this case possible for the tensioning means to comprise adjustable tensioning components. The tensioning means may also comprise at least one resilient tensioning component. Spring preloading can compensate for temperature-induced changes in the length of the cover strip. It may in addition prevent jerky tensile forces at the cover strip if stick-slip effects between the cover strip and the runner assembly occur.

In a preferred embodiment, the runner assembly comprises a runner which is responsible for its guidance on the guide rail, with the approach means being disposed at least at one strip guide unit which can be mounted on the runner. The runner may be a commercially available series-produced component which can be adopted to form the runner assembly substantially without being modified. This applies in particular if the support face arrangement is disposed at least in part, in particular entirely, at the strip guide unit, of which there is at least one. In terms of mounting, it is favorable if fastening members serving to assemble the runner are also constructed for mounting the strip guide unit. For example, fastening screws which serve to fasten top units of the runner to a main body of the latter may be provided with an additional thread serving to subsequently mount the strip guide unit on the pre-mounted runner.

A respective strip guide unit is expediently mounted at axially opposite end faces of the runner. These may have an outer contour which—viewed in the axial direction away from the runner—narrows as the distance from the runner increases, so that the runner assembly has a pleasant exterior.

The cover strip is expediently guided past the runner on the outside. It is then advisable to protect the cover strip against damage by a guard bow which is mounted on the strip guide unit, of which there is at least one.

The runner assembly may bear at least one lubricant dispenser for lubricating the cover strip in order to reduce the friction between the cover strip and the approach means as well as the support face arrangement. This lubricant dispenser may comprise a lubricating body which contains lubricant and is in lubricating contact with the cover strip. The lubricating body may at the same time be in lubricating contact with at least one guideway covered by the cover strip. This lubricating body is appropriately disposed in a strip guide unit which may also be configured so as to additionally accommodate a lubricant reservoir which is connected for supply purposes to the lubricating body, of which there is at least one. The lubricating body may take over at least a part of the strip guide function of the strip guide unit.

BRIEF DESCRIPTION OF THE DRAWINGS

The invention will be described in greater detail below by reference to the forms of embodiment as represented in the drawings, wherein.

Figure 1:
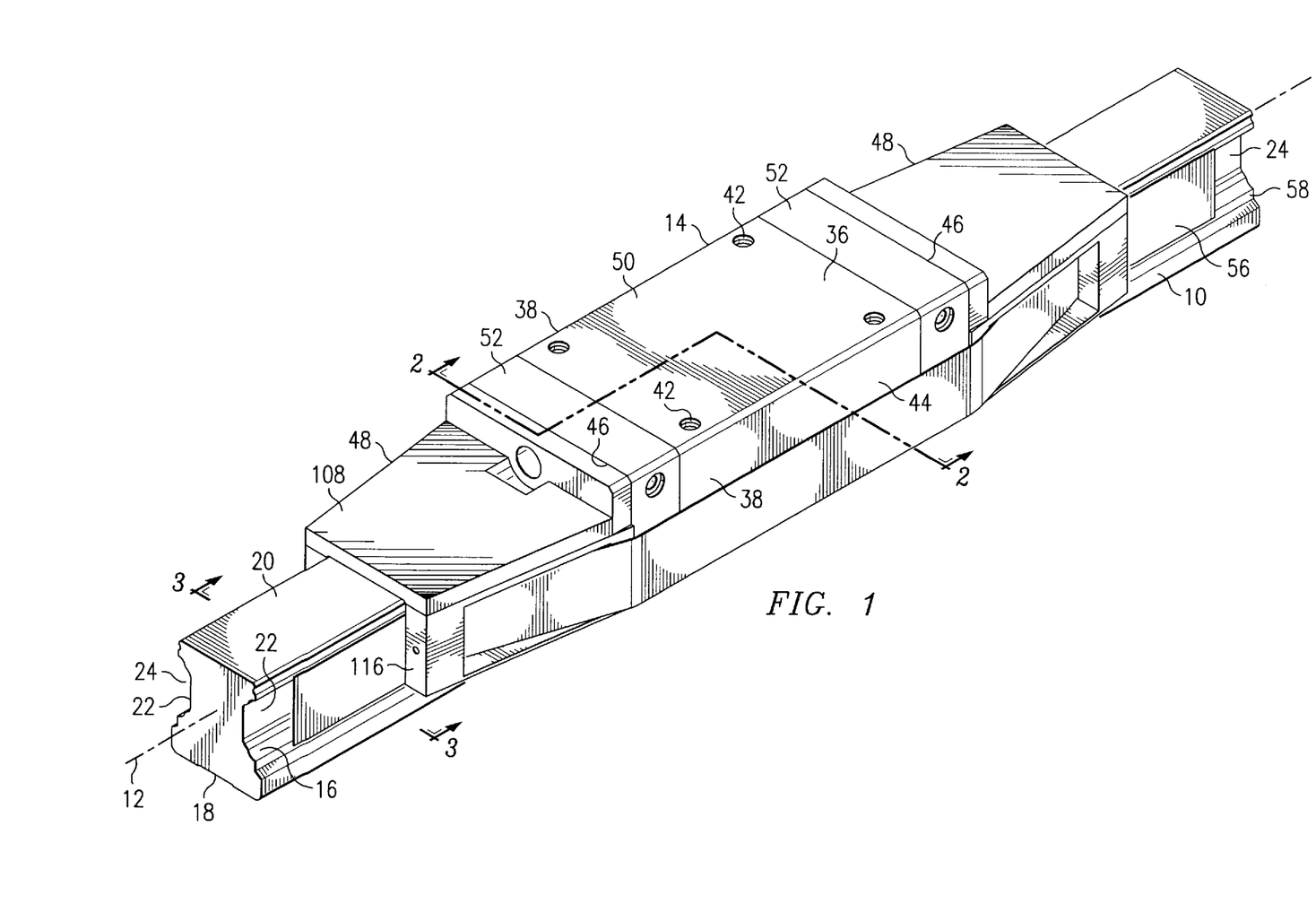
FIG. 1 is a perspective representation of an embodiment of the linear guide device according to the invention.

FIG. 1 shows a guide rail 10, which can be fastened to a base not shown in detail and on which a runner assembly 14 is displaceably guided in the direction of a rail longitudinal axis 12. The runner assembly 14 is guided on ball tracks 16, which are arched in a partially circular fashion in cross section, of the guide rail 10 through the intermediary of a plurality of ball loops. The guide rail 10 has a fastening face 18, by which it is placed on the base, a top face 20 and two opposite side faces 22, in which an approximately trapezoidal groove 24 is in each case formed, into whose groove flanks the ball tracks 16 are worked. Each side face 22 of the guide rail 10 therefore has two ball tracks 16. Four continuous ball loops are accommodated in the runner assembly 14 in accordance with the total of four ball tracks 18, which loops roll on one of the ball tracks 16 each case. The linear guide device shown in FIG. 1 is symmetrical with respect to a longitudinal centre plane containing the axis 12.

Figure 2:
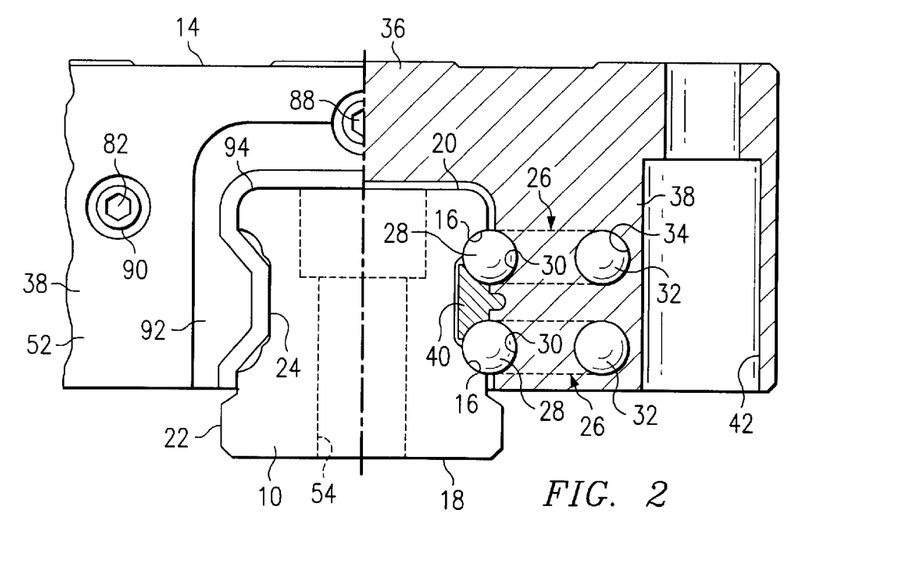
FIG. 2 is a section along the line 2—2 in FIG. 1.

FIG. 2 shall now also be discussed. Two of the above-mentioned four ball loops can be seen here. They are generally designated by 26. Each of the ball loops 26 comprises a load-transmitting rectilinear row of balls 28, which is in rolling engagement with one of the ball tracks 16 on the guide rail side and with a bearing ball track 30 formed at the runner assembly 14. Each ball loop 26 also comprises a returning rectilinear row of balls 32, which is guided in an associated return channel 34 of the runner assembly 14. The load-transmitting row of balls 28 and the returning row of balls 32 of each ball loop 26 are connected at both ends by a respective curved row of balls, which is not shown in detail in FIG. 2, these being guided in deflection guides of the runner assembly 14.

The runner assembly 14 embraces the guide rail 10 in the shape of a U, being adjacent to the top face 20 of the guide rail 10 via a web region 36 and lying opposite each of the side faces 22 of the guide rail 10 via leg regions 38. A retaining gib 40 is disposed at each of the leg regions 38 on the inner side which faces the guide rail 10 and retains the balls of the load-transmitting rows of balls 28 at the runner assembly, so that they are not lost when the runner assembly 14 is removed from the guide rail 10. Locating holes 42 for fastening bolts are also provided in the leg regions 38, these bolts serving to fasten an object which is to be moved, for instance a support table engaging over runner assemblies guided on different guide rails, or a tool or workpiece holder, on the runner assembly 14.

The runner assembly 14 comprises a runner 44, which takes over the actual guide function, and two strip guide units 48, which are fastened to each of the end faces 46, lying opposite in the axial direction 12, of the runner 44 and the function of which is explained in the following. The runner 44 is composed of a main runner body 50, which contains the return channels 34 for the returning rows of balls 32 and is constructed at its inner leg sides which face the guide rail 10 with the rectilinear bearing ball tracks 30 for the load-transmitting rows of balls 28. A respective top unit 52 of substantially the same contour is mounted at both ends, lying opposite in the axial direction 12, of the main runner body 50, in which unit the deflection guides for the curved rows of balls are accommodated, at-least in part. The ball loops 26 and their associated track system are completely accommodated in the runner 44. The strip guide units 48 are generally of secondary importance for the guidance of the runner-assembly 14 on the guide rail 10. Commercially available, pre-mounted runners may thus be used without any substantial modifications. Just one or three or even more ball loops 26 may of course be provided instead of two ball loops 26 in each leg region 38 of the runner assembly 14. It equally makes no difference, within the scope of the invention, if other rolling bodies, for example, rollers, barrels or needles, are used instead of the balls.

Bolt locating holes 54, which pass from the top face 20 to the fastening face 18, are provided in the guide rail 10 at regular distances along the longitudinal axis 12. Fastening bolts serving to screw the guide rail 10 to the base may be inserted in the bolt locating holes 54.

It is important to protect the ball tracks 16 against contaminants, whether these be hot chips or particles of dirt, which may mix with lubricant adhering to the guide rail 10 to produce a highly abrasive mixture, in order to maintain the guide precision and easy mobility of the runner assembly 14 on the guide rail 10. For this purpose the two ball tracks 16 provided in each of the side faces 22 of the guide rail 10 are covered in pairs by a common cover strip 56, the free strip ends of which are fastened in the end regions of the guide rail 10. The cover strip 56 lies tightly against the guide rail 10 to prevent the penetration of dirt over the entire length of this rail, with the exception of the region of the runner assembly 14, where it is guided externally past the-runner 44 and again pressed by the strip guide units 48 at the front and at the rear end of the runner assembly 14 against the guide rail 10. When the runner assembly 14 moves longitudinally, it therefore sweeps along the cover strip 56, the term "sweep" to be understood as a low-friction and low-wear sliding action.

Figure 3:
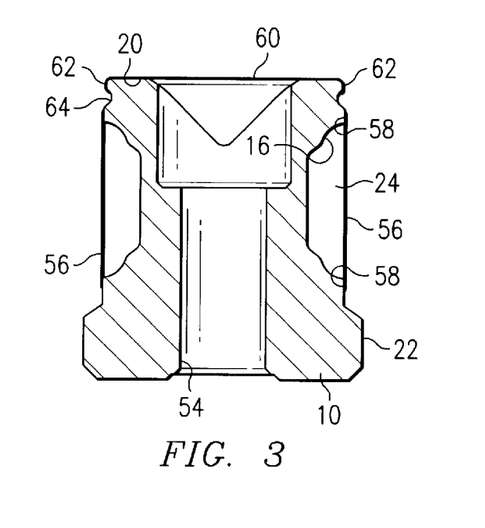
FIG. 3 is a section along the line 3—3 in FIG. 1.
Figure 4:
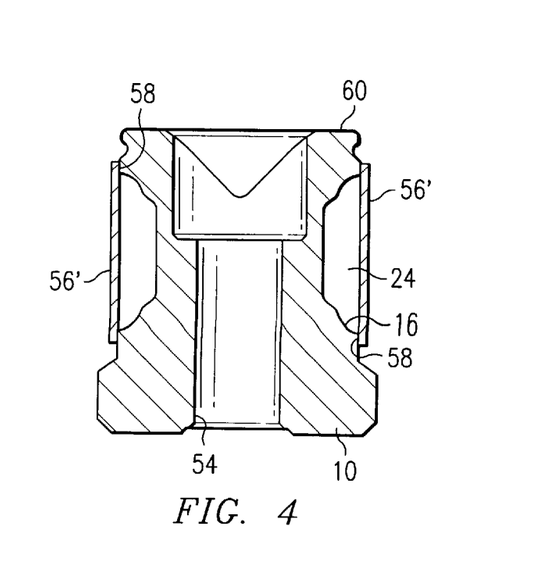
FIG. 4 is a variant of FIG. 3.
Figure 5:
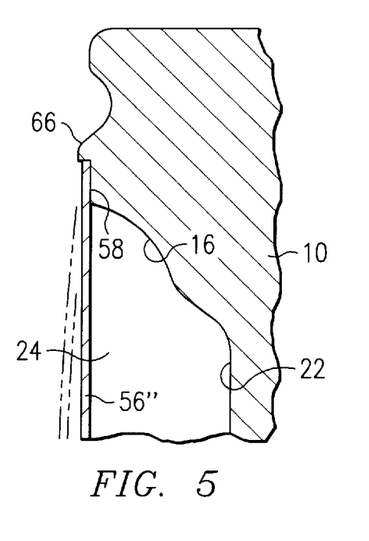
FIG. 5 is an enlarged detail from FIG. 3 of a further variant.

FIGS. 3–5 shall now be discussed. In FIG. 3 the two cover strips 56 disposed on both sides of the guide rail 10 are formed as metal strips, in particular spring steel strips. Each of the cover strips 56 completely covers the trapezoidal groove 24, which is formed in the respective side face 22 of the guide rail 10, and lies with its large-side lateral longitudinal edges against coplanar contact faces 58 of the guide rail 10. These contact faces 58, on which the respective cover strip 56 lies, directly adjoin the ball tracks 16, which are disposed in the outermost edge regions of the groove flanks of the trapezoidal groove 24. If the guide rail 10 is made of a metallic material, in particular steel, the cover strips 56 can be magnetised in order to retain them firmly at the guide rail 10. It is understood that the ball tracks 16 may also be individually covered by a respective cover strip 56, especially when the profile of the guide rail 10 varies. It is equally understood that more than two ball tracks may be formed in each of the side faces 22 of the guide rail 10, all these tracks being covered by a common cover strip 56. In each case the ball tracks 16 and the contact faces 58 are formed at a rail body of the guide rail 10 which consists of a uniform base material. This means that it is possible, in order to produce the guide rail 10, to provide an extruded steel section in the region of the ball tracks 16 with a special, particularly hard coating which does not extend into the region of the contact faces 58. Yet in this case the ball tracks 16 and the contact faces 58 would be formed at one and the same base material, i.e. the steel section. Induction hardening of the side face regions of the guide rail 10 would not change the situation at all. The guide rail 10 could equally be provided in the region of the contact faces 58 with a coating which increases the sealing effect, for example a rubber film, without this resulting in any change in the base material at which the ball tracks 16 and the contact faces 58 are formed. Finally, the possibility of the guide rail 10 being composed of a plurality of rail sub-bodies should not be ruled out.

A top face cover strip 60 is clipped onto the top face 20 of the guide rail 10 and engages by way of side edges 62, which are bent at an acute angle, in a respective recess 64 formed in each of the side faces 22 near the top face. The top face cover strip 60 provides a smooth surface over the fastening bolts which are inserted in the bolt locating holes 54, along which surface the runner assembly 14 can travel in a sealed fashion.

Plastics strips 56" are provided instead of the steel strips 56 in the variant of FIG. 4. Otherwise this variant does not differ fron the embodiment of FIG. 3. Composite material strips, for example of plastics-coated metal, may also replace pure metal or plastics strips. Rubber or textile strips are further possibilities, depending on where the linear guide device is used.

The variant of FIG. 5 presents a cover strip 56" which does not just lie against the guide rail 10 at its large side which faces the ball track, i.e. in the region of the contact faces 58, but also by way of its narrow sides. For this purpose the contact faces 58 are bounded laterally by a respective aligning shoulder 66, on which the cover strip 56" abuts by way of its narrow sides. The cover strip 56" is prevented from slipping transversely to the guide rail 10 by the aligning shoulders 66.

The aligning shoulders 66 may be used for frictionally securing the cover strip 56" at the-guide rail 10. For this purpose the width of the cover strip 56" is slightly greater than the distance between the two opposite aligning shoulders 66 (only one of which can be distinguished in FIG. 5). If the cover strip 56" is compressed slightly at its longitudinal edges, it curves, so that it can be placed between the opposite aligning shoulders 66. If it is then released, it tends to lie flat again. Since, however, it is wider than the distance between the opposite aligning shoulders 66, it retains a slight curvature. This corresponds to a curvature preload under whose effect the cover strip 56" is pressed against the aligning shoulders 66, resulting in a frictional fit of the cover strip 56" in the groove formed by the alignin shoulders 66. This situation is represented by broken lines in FIG. 5. The cover strip 56" does not of course have to lie flat against the contact faces 58 in this case. On the contrary, it is quite possible for it to be supported solely by way of its narrow sides at the guide rail 10, specifically at the aligning shoulders 66.

FIGS. 3–5 shall now be discussed. In FIG. 3, the two cover strips 56 disposed on both sides of the guide rail 10 are formed as metal strips, in particular spring steel strips. Each of the cover strips 56 completely covers the trapezoidal groove 24, which is formed in the respective side face 22 of the guide rail 10, and lies with its large-side lateral longitudinal edges against coplanar contact zones, or faces, 58, of the guide rail 10. These contact faces 58, on which the respective cover strip 56 lies, directly adjoin the ball tracks 16, which are disposed in the outermost edge regions of the groove flanks of the trapezoidal groove 24. If the guide rail 10 is made of a metallic material, in particular steel, the cover strips 56 can be magnetised in order to retain them firmly at the guide rail 10. It is understood that the ball tracks 16 may also be individually covered by a respective cover strip 56, especially when the profile of the guide rail 10 varies. It is equally understood that more than two ball tracks may be formed in each of the side faces 22 of the guide rail 10, all these tracks being covered by a common cover strip 56. In each case the ball tracks 16 and the contact faces 58 are formed at a rail body of the guide rail 10 which consists of a uniform base material. This means that it is possible, in order to produce the guide rail 10, to provide an extruded steel section in the region of the ball tracks 16 with a special, particularly hard coating which does not extend into the region of the contact faces 58. Yet in this case the ball tracks 16 and the contact faces 58 would be formed at one and the same base material, i.e. the steel section. Induction hardening of the side face regions of the guide rail 10 would not change the situation at all. The guide rail 10 could equally be provided in the region of the contact faces 58 with a coating which increases the sealing effect, for example a rubber film, without this resulting in any change in the base material of which the ball tracks 16 and the contact faces 58 are formed. Finally, the possibility of the guide rail 10 being composed of a plurality of rail sub-bodies should not be ruled out.

Should the cover strip 56 firstly be curved slightly before being inserted between opposite aligning shoulders, as explained in connection with FIG. 5, this may be achieved, for example, by appropriately shaping the pressing faces 74. For this purpose these may be produced with an arch about an axis of arch which is parallel to the longitudinal direction of the strip, which arch may be convex or concave. The cover strip 56 is therefore given the desired strip curvature at the pressing faces 74 which allows it to run easily between the aligning shoulders 66 of FIG. 5.

Figure 7:
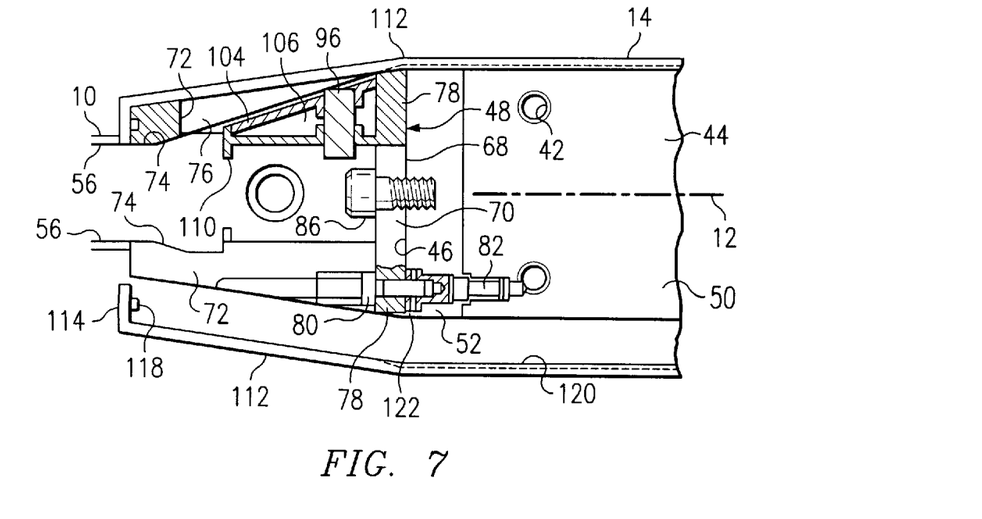
FIG. 7 is a part-sectional view from above of the linear guide unit of FIG. 1.

FIG. 7 shows the path which the cover strips 56 disposed on both sides of the guide rail 10 are made to follow by the strip guide body 68. The cover strips 56 are each lifted by the lift support face 78 out of bearing contact with the guide rail 10 and run past the runner 44 at a slight distance therefrom, so that they do not sweep against the latter. FIG. 7 also shows the way in which the strip guide body 68 is fastened to the runner 44. This is effected by means of screw bolts 80, which are screwed axially through the plate part 70 into a respective internal thread formed in the head of a fastening screw 82, which in turn serves to screw the top unit 52 to the main runner body 50. This measure enables conventional runners to be subsequently fitted with the strip guide units 48 without any problems. For all that is required is to replace the fastening screws which are usually provided and by which the top units 52 are fastened to the main runner body 50 by fastening screws 82 which allow the screw bolts 80 to be subsequently screwed in, if this has not already taken place in a series-production process, for example for mounting scrapers or other attachments.

The plate part 70 additionally comprises a through-hole 84 in the centre of its web region (see FIG. 6), through which hole a lubricant supply system, formed in the runner 44, for supplying the ball loops thereof with lubricant is accessible from outside. A stopper 86 (see FIG. 7) may be inserted in the through-hole 84. A lubricating nipple may alternatively be inserted. There is also the possibility of a lubricating nipple of this kind already being inserted in a lubrication connecting bore, lying opposite the through-hole 84, of the associated top unit 52, and the through-hole 84 simply providing access to the lubricating nipple. FIG. 2 shows this case, in which the top unit 52 is constructed with a lubricating nipple 88 in its web region. This figure also shows one of the fastening screws 82 with a diagrammatically indicated internal thread 90. Also evident is a sealing plate 92, which is inserted flush in the top unit 52, with a sealing lip arrangement 94 adapted to the outer contour of the guide rail 10 and lying tightly against this.

Figure 6:
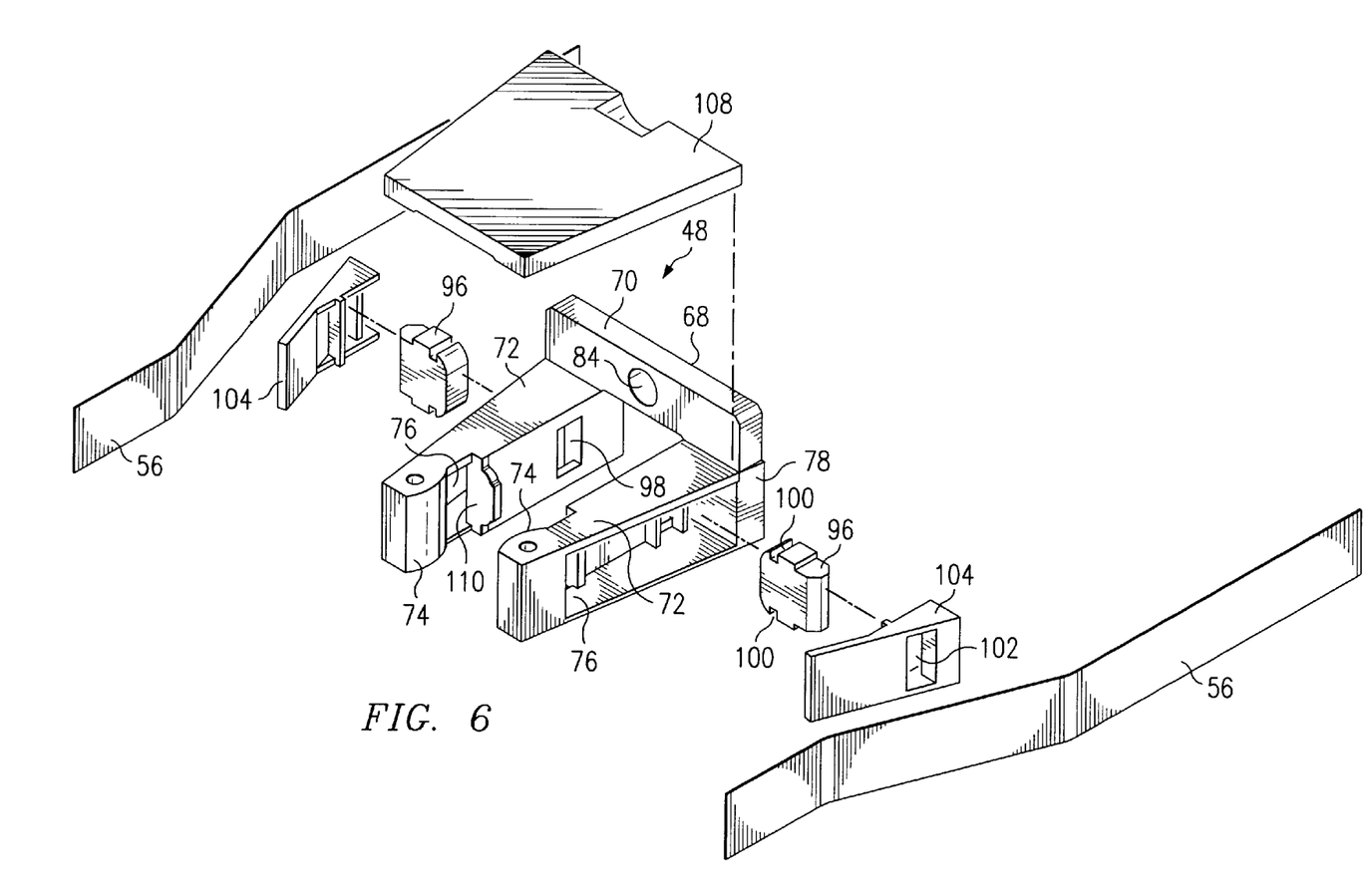
FIG. 6 is a perspective exploded representation of a strip guide unit with two cover strips.

FIGS. 6 and 7 shall now be discussed again. A lubricating body 96 is accommodated in each of the plate extensions 72, over which body on one side the cover strip runs by way of its large side which faces the rail and which on the other side is in lubricating contact with the two ball tracks 16 of the respective side face 22 of the guide rail 10. The friction-induced wear of the cover strips 56 is reduced by lubricating these. The cover strips 56 may of course also be wetted with lubricant on their large side which is remote from the rail by the lubricating bodies 96 or other lubricating bodies separate from the latter in order also to reduce the friction at the pressing faces 74. The lubricating bodies 96 each project out of a window 98 in the plate extensions 72 towards the guide rail 10 and are retained by locking recesses 100 at the window edges. They each project towards the cover strips 56 through a window 102 formed in a closure cap 104 which can be placed on the respective plate extension 72 from the side which is remote from the rail. As can be seen in the top half of FIG. 7, the plate extensions 72 each define by way of their closure caps 104 an internal cavity 106 which can be used as a lubricant reservoir. If the lubricating bodies 96 are formed by absorbent materials which conduct through a capillary action, for example of felt or a foamed plastic, they can automatically supply the lubricating bodies 96, which communicate with the cavities 106, with an oil reserve if a quantity of oil is stocked in these cavities 106, thereby ensuring that lubricating oil is constantly and uniformly delivered to the cover strips 56 and the ball tracks 16. The closure caps 104 may be permanently stuck or welded to the plate extensions 72 in order to seal the cavities 106, in which case the quantity of lubricant stored in the lubricating bodies 96 and optionally in the cavities 106 is adapted to the service life of the linear guide device if there is no additional relubricating connection at the strip guide body 68. The closure caps 104 may alternatively be detachable from the plate extensions 72, in which case an additional sealing lip arrangement is expediently formed at the closure caps 104 or/and the plate extensions 72 in order to ensure that the cavities 106 are perfectly sealed.

A cover 108 can be placed from above on the plate extensions 72 to encapsulate the respective strip guide unit 48. A web projection 110, which conforms at least approximately with the side face contour of the guide rail 10 and which may serve as a coarse scraper to scrape off any coarse contaminants remaining on the guide rail 10, may in addition be formed onto the inner side of the plate extensions 72 which faces the rail. However it is also possible for the web projections 110 to be tightly engaged with the side faces 22 of the guide rail 10, in particular with the ball tracks 16, so that the lubricant delivered to the guide rail 10 by the lubricating bodies 96 remains within the runner assembly 14. As regards material, the strip guide body 68, the closure caps 104 and the cover 108 may be made of an extrudable plastics material. However they may also be made of zinc die castings in order to provide protection against hot chips and aggressive media.

In FIG. 1 the cover strip 56 runs externally past the runner 44 in an exposed fashion. In order to protect it against damage and improve the encapsulation of the runner assembly 14, FIG. 7 shows guard bows 112 which are placed on the runner assembly 14 at the sides and snapped into place by way of angled bow ends 114 at the axial end faces of the strip guide units 48. For this purpose locking recesses 116 (cf. FIG. 1) are formed in the plate extensions 72, in which recesses corresponding snap pins 118 (see FIG. 7) of the guard bows 112 engage. The guard bows 112 completely cover the cover strips 56 in the region of the runner assembly 14. They comprise a recess 120 (indicated by a broken line in FIG. 7) along the runner 44 at their inner side which faces the runner, in which recess the respective cover strip 56 runs.

FIGS. 1 and 7 also show how the strip guide units 48 narrow as the distance from the runner 44 increases, so that the construction space taken up by the strip guide units 48 can be kept to a minimum.

Figure 8:
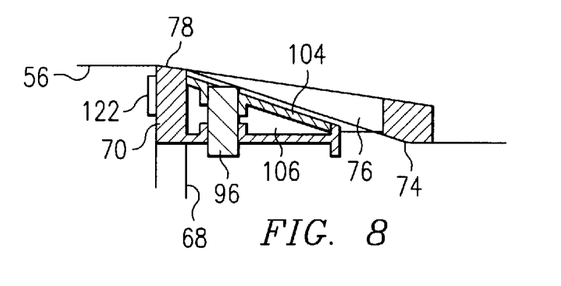
FIG. 8 is a detail of a strip guide unit which can be seen in FIG. 7.

It can in addition be seen in FIG. 8, which basically shows a detail from FIG. 7, that the strip guide body 68 comprises one or more positioning rings 122 at the bearing side, which faces the runner, of the plate part 70, by way of which the latter comes to lie against the front face 46 of the runner 44, which rings serve to position the strip guide body 68 relative to the runner 44 and engage in associated recesses (not shown in detail), which are formed in the respective front face 46 of the runner 14. The positioning rings 122 may in particular engage in recesses in the front face 46 in which fastening screws 82, which serve to mount the runner 44, are also inserted. These are indicated in FIG. 7.

Figure 9:
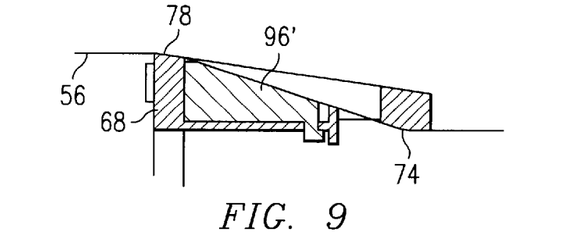
FIG. 9 is a variant of FIG. 8.

FIG. 9 shows a variant of FIG. 8 with a lubricating body 96' formed differently. Whereas the cover strip 56 in FIG. 8 essentially only runs over a lubricating edge of the lubricating body 96, the lubricating body 96' in FIG. 9 is in lubricating contact with the cover strip 56 over a large area. The material of the lubricating body 96' may be a polymer mixed with lubricant, i.e. a material containing a polymer as the base material, with which polymer components having lubricating properties have been admixed during production. The lubricant can be delivered to the lubricating body 96' by the action of pressure or heat.

Figure 10:
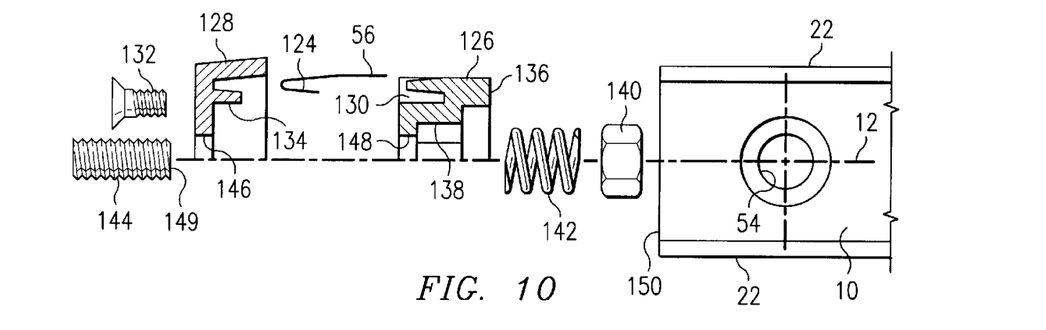
FIG. 10 is a clamping mechanism for cover strip ends.

FIG. 10 shows how the ends of the cover strip 56 are fastened at the guide rail 10. This figure presents a strip end 124 which is bent like a hook and can be clamped between a bottom clamping part 126 and a top clamping part 128. The cover strip 56 is secured by its hook end 124 in a hook receptacle 130 of the bottom clamping part 126. The top clamping part 128 is then screwed onto the bottom clamping part 126 by means of screws 132. In the process the top clamping part 128 engages by way of a securing projection 134 in the hook receptacle 130 of the bottom clamping part 126 and secures the hook end 124 of the cover strip 56. The bottom clamping part 126 is fitted on the guide rail end, optionally together with the screwed-on top clamping part 128, for mounting purposes. This fitting process is here understood to mean that axial plug projections 136 are formed on the bottom clamping part 126, preferably engage positively in the trapezoidal grooves 24 (not shown in FIG. 10) in the two side faces 22 of the guide rail 10 and prevent the bottom clamping part 126 from turning relative to the guide rail 10 about the longitudinal axis 12. However the plug projections 136 do not engage in the trapezoidal grooves 24 with a press fit, but rather relatively loosely, so that the bottom clamping part 126 can be displaced along the guide rail 10. This displaceability enables the cover strips 56 to be tensioned.

The bottom clamping part 126 comprises a polygonal recess 138 for holding a threaded nut 140 positively, i.e. such that it cannot turn, at its axial side which faces the rail. A preloading spring 142 is additionally placed in the recess 138 between the nut 140 and the bottom clamping part 126. An adjusting bolt 144 is then screwed into the threaded nut 140 through through-openings 146 and 148 in the top clamping part 128 and the bottom clamping part 126, respectively, to an extent such that it emerges from the threaded nut 140 and is supported by way of a support end 149 at an axial front face 150 of the guide rail 10. The adjusting bolt 144 can be adjusted to subject the cover strips 56 fixed in the clamping block 126, 128 to a basic preload, on which a spring preload applied by the preloading spring 142 is superimposed. The resilient displaceability of the clamping block 126, 128 which is thereby achieved is particularly advantageous should the runner assembly 14 execute comparatively jerky movements if attempting to pull the cover strips 56 with it as it starts to move. The spring 142 has a compensatory effect here. A resilient clamping mechanism, as represented in FIG. 10, is preferably mounted at both rail ends. The cover strips 56 may of course also be fixed at the rail ends without spring preloading. An adjustable tension setting is useful in so far as it in the first place enables the clamping mechanism to be mounted more easily (the clamping block 126, 128 can firstly be fitted on the guide rail 10 with the cover strips 56 in a slack state; the strip tension is only applied by subsequently screwing in the adjusting bolt 144) and in the second re-tensioning of the cover strips 56 is possible if these become slack after operating for some time.

Figure 11:
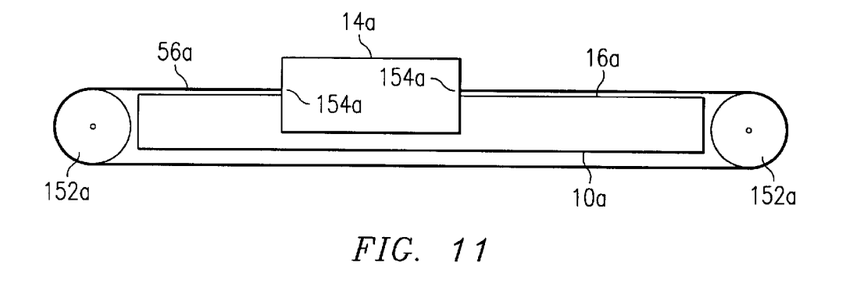
FIG. 11 is a modified embodiment, in a substantially diagrammatic form, of the linear guide device according to the invention
Figure 12:
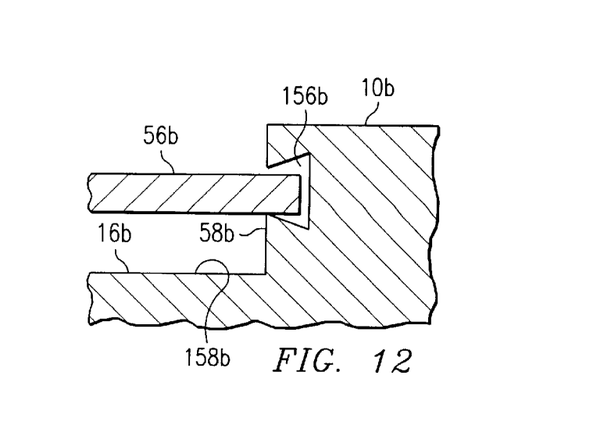
FIG. 12 is an enlarged representation of a further variant of FIG. 3.

In FIGS. 11 and 12 components which are the same or act in the same way as those in FIGS. 1–10 are given the same reference numbers, although supplemented with a small letter. The preceding description of FIGS. 1–10 is to be referred to for a more detailed explanation.

A runner assembly 14a is guided in a longitudinally displaceable manner on a guide rail 10a in the modification according to FIG. 11. This may again be a rolling guide. The runner assembly 14a may alternatively be guided in sliding fashion on the guide rail. One guideway 16a of the guide rail 10a is covered by a cover strip 56a. However this is not fixed at the rail ends, but rather closed to form a loop, being deflected in the region of the rail ends at rotatably mounted deflection pulleys 152a and returned on a side of the guide rail 10a lying opposite the guideway 16a. The cover strip 56a is connected to the runner assembly 14a at anchor points 154a. This means that the cover strip 56a also moves when the runner assembly 14a moves longitudinally.

In the modification of FIG. 12 a cover strip 56b is held by way of its longitudinal edges in a respective dovetail groove 156b which is formed in a guide rail 10b and has a trapezoidal cross section. The dovetail groove 156b is formed in undercut fashion in a groove flank of a rail groove 158b, in which a guideway 16b covered by the cover strip 56b is located. The cover strip 56b is retained loosely in the dovetail groove 156b in the representation of FIG. 12. This means that it is not clamped at the guide rail 10b either by way of its large sides or by way of its narrow sides. It simply lies loosely on a groove edge 58b, serving as a large-side contact zone, of the dovetail groove 156b. However it is of course possible for the cover strip 56b to be clamped both between the opposite groove edges 58b of the dovetail groove 156b at the large sides and between the bottom surfaces of two opposite dovetail grooves 156b at the narrow sides. In order to insert the cover strip 56b in the dovetail guide 156b, it is again expedient to curve the cover strip 56b by means of a suitable curving means at the strip guide units. If the cover strip 56b lies with play at the narrow sides in the dovetail groove 156b, it can subsequently lie completely flat again.

What is claimed is:

1. A linear guide device, comprising:
   a guide rail with a longitudinal axis and at least one guideway,
   a runner assembly guided at the guideway, of which there is a least one, in the direction of the longitudinal axis,
   said at least one guideway being covered, in the direction of the longitudinal axis, on both sides of the runner assembly substantially over the respective entire usable remaining length by a cover strip which lies against at least one cover strip contact zone of the guide rail or is close to said cover strip contact zone,
   securing means provided at at least one of the guide rail and the cover strip for securing the cover strip to the guide rail outside of the region of the runner assembly in the covering position, and
   said runner assembly being constructed in end regions with strip curvature means which give the cover strip a forced curvature facilitating its entry between mutually opposite narrow-side contact zones and therefore reducing the distance between the narrow sides of the cover strip.

2. A linear guide device according to claim 1, wherein the cover strip contact zone and the guideway correspond, at least in part.

3. A linear guide device according to claim 1, wherein the cover strip contact zone and the guideway differ, at least in part.

4. A linear guide device according to claim 3, wherein the cover strip covers the guideway in contact-free fashion and lies against cover strip contact zones of the guide rail which are located transversely to the longitudinal axis on both sides of the guideway.

5. A linear guide device according to claim 4, wherein the guideway is disposed in a depression in the guide rail which is covered by the cover strip and is formed between the cover strip contact zones.

6. A linear guide device according to claim 4, wherein the cover strip contact zones comprise large-side contact zones against which the cover strip lies by way of a large side which faces the guideway.

7. A linear guide device according to claim 6, wherein the large-side contact zones are formed by plane, coplanar contact faces.

8. A linear guide device according to claim 1, wherein at least one cover strip contact zone is formed as a narrow-side contact zone against which the cover strip lies by way of a narrow side thereof.

9. A linear guide device according to claim 8, wherein mutually opposite narrow-side contact zones are formed at the guide rail for opposite narrow sides of the cover strip.

10. A linear guide device according to claim 9, wherein the narrow-side contact zones are undercut for the engagement of the narrow sides of the cover strip.

11. A linear guide device according to claim 9, wherein the cover strip can be frictionally clamped between mutually opposite narrow-side contact zones.

12. A linear guide device according to claim 1, wherein the cover strip can be positively secured in its covering position at the guide rail.

13. A linear guide device according to claim 1, wherein the width of the cover strip is adapted to the securing means such that the cover strip is pre-curved in the covering position.

14. A linear guide device according to claim 1, wherein the cover strip can be retained in the covering position through magnetic means.

15. A linear guide device according to claim 1, wherein the guideway and the cover strip contact zone are formed together at a rail body of the guide rail which is of a uniform base material.

16. A linear guide device according to claim 1, wherein the guideway and the cover strip contact zone are disposed at a rail body of an integrally coherent material.

17. A linear guide device according to claim 1, wherein the guide rail comprises at least two guideways extending parallel to one another and being jointly covered by the cover strip.

18. A linear guide device according to claim 1, wherein the guide rail comprises a fastening face, a top face lying opposite the fastening face and two side faces connecting the fastening face to the top face, at least one respective guideway is formed in each of the side faces, and at least one respective cover strip is provided at each side face for an associated guideway, of which there is at least one.

19. A linear guide device according to claim 18, wherein, when there are at least two respective guideways in each of the side faces, all the guideways of each of the side faces are covered by a respective common cover strip.

20. A linear guide device according to claim 1, wherein the cover strip comprises a metallic material.

21. A linear guide device according to claim 1, wherein the cover strip comprises a plastics material.

22. A linear guide device according to claim 1, wherein the runner assembly is guided in sliding fashion on the guideway formed as a slideway.

23. A linear guide device according to claim 1, wherein the runner assembly is guided on the guideway formed as a rolling track via at least one rolling body.

24. A linear guide device according to claim 23, wherein the runner assembly is guided on the rolling track by at least one roller rotatably mounted on the assembly.

25. A linear guide device according to claim 23, wherein the runner assembly is guided on the rolling track by at least one row of rolling bodies circulating along a continuous circulation path.

26. A linear guide device according to claim 1, wherein the cover strip is fastened to the runner assembly to move together with the latter along the longitudinal axis.

27. A linear guide device according to claim 1, wherein the cover strip runs across a support face arrangement of the runner assembly at a large side thereof which faces the guideway, and the runner assembly comprises approach means which retain the cover strip before and after the support face arrangement in the longitudinal direction close to the guide rail.

28. A linear guide device according to claim 27, wherein the cover strip has free strip ends which are retained at locations adjacent to rail end regions, which locations are spaced apart in the longitudinal direction, of the guide rail.

29. A linear guide device according to claim 28, wherein at least one of the strip ends can be anchored in an anchorage block which is supported at an axial front face of the associated rail end.

30. A linear guide device according to claim 29, wherein two cover strips disposed at opposite side faces of the guide rail can be anchored in the anchorage block.

31. A linear guide device according to claim 30, wherein the anchorage block can be fitted axially on the associated rail end.

32. A linear guide device according to claim 27, wherein the runner assembly comprises a runner which is responsible for its guidance on the guide rail, and the approach means are disposed at least at one strip guide unit which is or can be mounted on the runner.

33. A linear guide device according to claim 32, wherein a support face arrangement is also disposed at least in part at the strip guide unit, of which there is at least one.

34. A linear guide device according to claim 32, wherein fastening members serving to assemble the runner are also constructed for mounting the strip guide unit.

35. A linear guide device according to claim 32, wherein fastening screws which serve to fasten top units of the runner to a main body of the runner are provided with an additional thread serving to mount the strip guide unit on a premounted runner.

36. A linear guide device according to claim 32, wherein a respective strip guide unit is mounted axially opposite end faces of the runner.

37. A linear guide device according to claim 36, wherein the strip guide units have an outer contour which—viewed in the axial direction away from the runner—narrows as the distance from the runner increases.

38. A linear guide device according to claim 32, wherein the cover strip is guided past the runner on the outside thereof and protected against damage by a guard bow which is mounted on the strip guide unit, of which there is at least one.

39. A linear guide device according to claim 1, wherein the cover strip can be tensioned by tensioning means which are disposed in the region of at least one rail end.

40. A linear guide device according to claim 39, wherein the tensioning means comprise adjustable tensioning components.

41. A linear guide device according to claim 39, wherein the tensioning means comprise at least one resilient tensioning component.

42. A linear guide device according to claim 1, wherein the runner assembly bears at least one lubricant dispenser for lubricating the cover strip.

43. A linear guide device according to claim 42, wherein the lubricant dispenser comprises a-lubricating body which contains lubricant and is in lubricating contact with the cover strip.

44. A linear guide device according to claim 43, wherein the lubricating body is at the same time in lubricating contact with at least one guideway covered by the cover strip.

45. A linear guide device according to claim 43, wherein the lubricating body is disposed in a strip guide unit and takes over at least a part of the strip guide function of the strip guide unit.

46. A linear guide device according to claim 45, wherein a lubricant reservoir is accommodated in the strip guide unit and is connected for supply purposes to the lubricating body, of which there is at least one.

47. A linear guide device, comprising:
- a guide rail with a longitudinal axis and at least one guideway,
- a runner assembly guided at the guideway, of which there is at least one, in the direction of the longitudinal axis,
- said at least one guideway being covered, in the direction of the longitudinal axis, on both sides of the runner assembly substantially over the respective entire usable remaining length by a cover strip which lies against at least one cover strip contact zone of the guide rail or is close to said cover strip contact zone,
- said cover strip running across a support face arrangement of the runner assembly at a large side thereof which faces the guideway,
- said runner assembly comprising approach means which retain the cover strip before and after the support face arrangement in the longitudinal direction close to the guide rail,
- said runner assembly comprising a runner which is responsible for its guidance on the guide rail,
- said approach means being disposed at least at one strip guide unit which is or can be mounted on the runner, and
- fastening members serving to assemble the runner being also constructed for mounting the strip guide unit.

48. A linear guide device according to claim 47, wherein fastening screws which serve to fasten top units of the runner to a main body of the runner are provided with an additional thread serving to mount the strip guide unit on a pre-mounted runner.

49. A linear guide device, comprising
- a guide rail with a longitudinal axis and at least one guideway,
- a runner assembly guided at the guideway, of which there is at least one, in the direction of the longitudinal axis,
- said at least one guideway being covered, in the direction of the longitudinal axis, on both sides of the runner assembly substantially over the respective entire usable remaining length by a cover strip which lies against at least one cover strip contact zone of the guide rail or is close to said cover strip contact zone,
- said runner assembly bearing at least one lubricant dispenser for lubricating the cover strip, and
- said lubricant dispenser comprising a lubricating body which contains lubricant and is in lubricating contact with the cover strip.

50. A linear guide device according to claim 49, wherein the lubricating body is at the same time in lubricating contact with at least one guideway covered by the cover strip.

51. A linear guide device according to claim 49, wherein the lubricating body is disposed in a strip guide unit and, if desired, takes over at least a part of the strip guide function of the strip guide unit.

52. A linear guide device according to claim 49, wherein a lubricant reservoir is accommodated in the strip guide unit and is connected for supply purposes to the lubricating body, of which there is at least one.

* * * * *

UNITED STATES PATENT AND TRADEMARK OFFICE
CERTIFICATE OF CORRECTION

PATENT NO. : 6,435,719 B1
DATED : August 20, 2002
INVENTOR(S) : Riedel et al.

It is certified that error appears in the above-identified patent and that said Letters Patent is hereby corrected as shown below:

Column 1,
Line 50, "depends" should read -- it depends --

Column 2,
Line 48, "position" should read -- position— --

Column 5,
Line 40, "invention and" should read -- invention, and --

Column 6,
Line 34, "at-least" should read -- at least --
Line 65, "the-runner" should read -- the runner --

Column 7,
Line 10, "contact faces" should read -- contact zones, or faces --
Line 37, "at" should read -- of --
Line 51, "fron" should read -- from --

Column 8,
Line 11, "alignin" should read -- aligning --
Lines 18-54, replace the paragraph with the following:
-- Figure 6 shall now be discussed. As is obvious, the strip guide unit which this shows comprises a strip guide body 68 having a U-shaped plate part 70, from the U-legs of which axial plate extensions 72 lying opposite the rail side faces 22 extend. The plate extensions 72 may be produced in one piece with the plate part 70, for example as a plastics injection-moulded part. They may also be produced separately from the plate part 70 and connected to the latter by plug-type connection means, for example. Each of the plate extensions 72 comprises at its inner side which faces the rail side face 22 a convexly arched pressing face 74, which serves to press the cover strip 56 against the guide rail 10. A through-opening 76 is formed in each of the plate extensions 72 after the pressing face 74 in the direction of the plate part 70, which opening allows the cover strip 56 to pass to the outer side, which is remote from the rail, of the respective plate extension 72. Finally, a respective lift support face 78, which is also curved slightly in convex fashion, is formed at the outer leg sides of the plate part 70 to lift the cover strip 56 off the guide rail 10 and guide it past the runner 44. --

UNITED STATES PATENT AND TRADEMARK OFFICE
CERTIFICATE OF CORRECTION

PATENT NO.    : 6,435,719 B1
DATED         : August 20, 2002
INVENTOR(S)   : Riedel et al.

It is certified that error appears in the above-identified patent and that said Letters Patent is hereby corrected as shown below:

<u>Column 14,</u>
Line 42, "axially" should read -- at axially --

Signed and Sealed this

Thirty-first Day of December, 2002

JAMES E. ROGAN
*Director of the United States Patent and Trademark Office*